Figure 11:
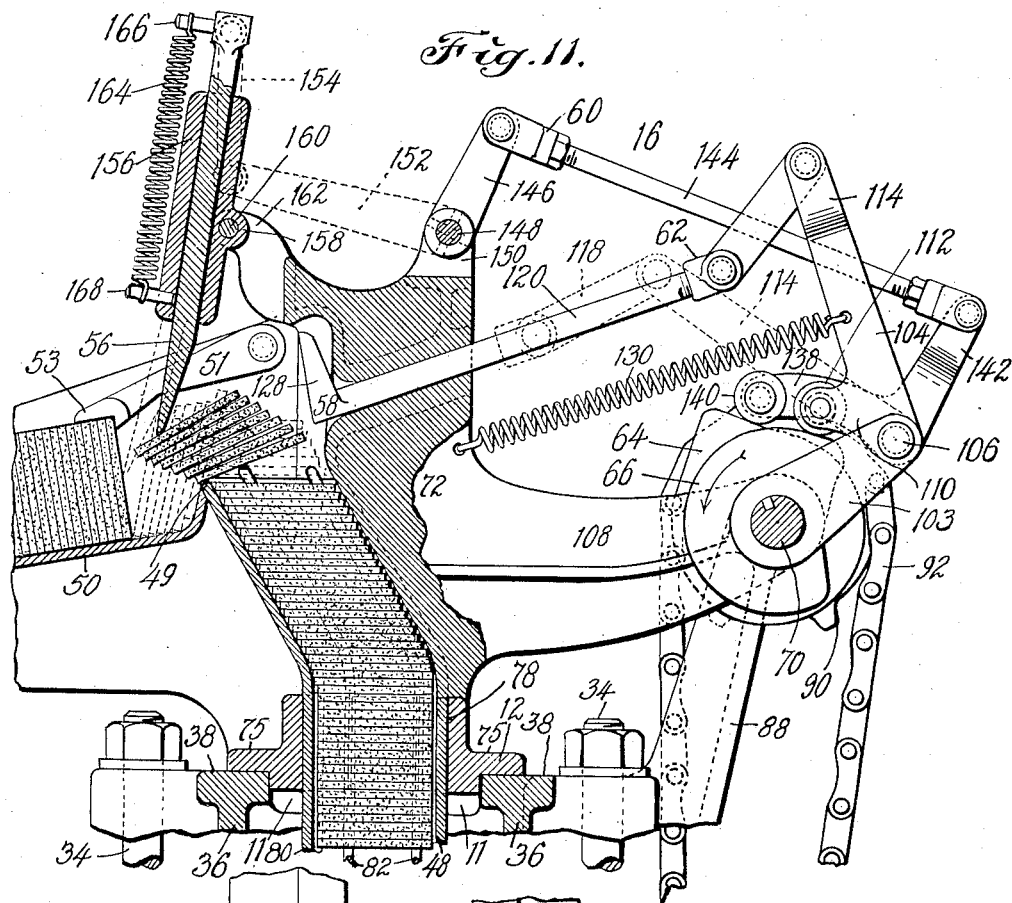

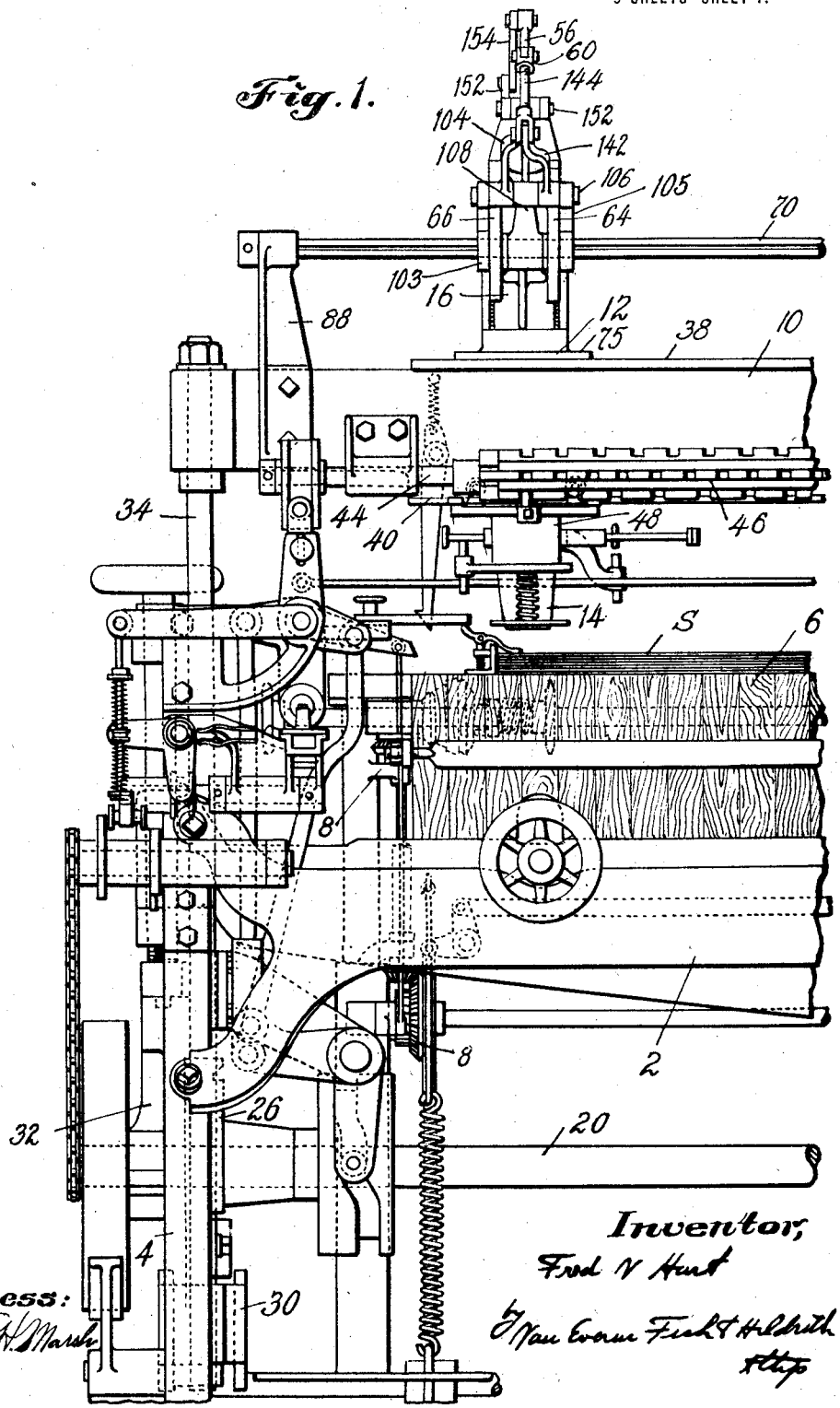

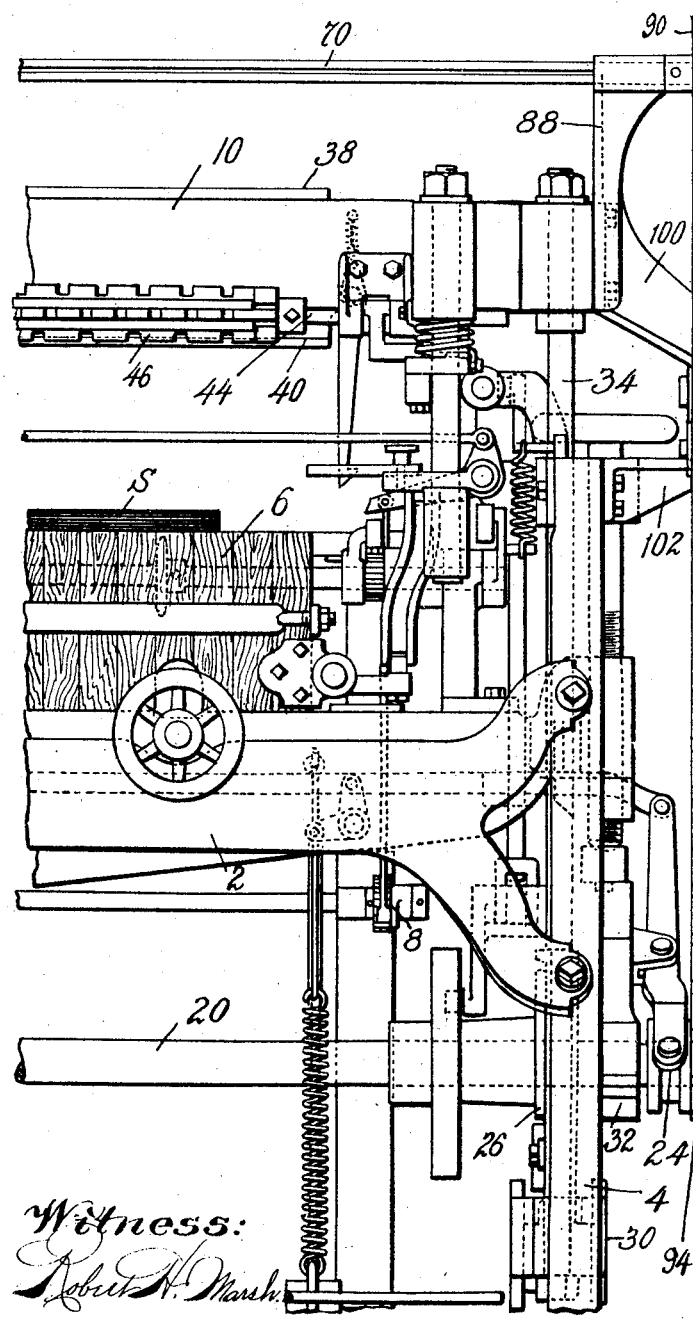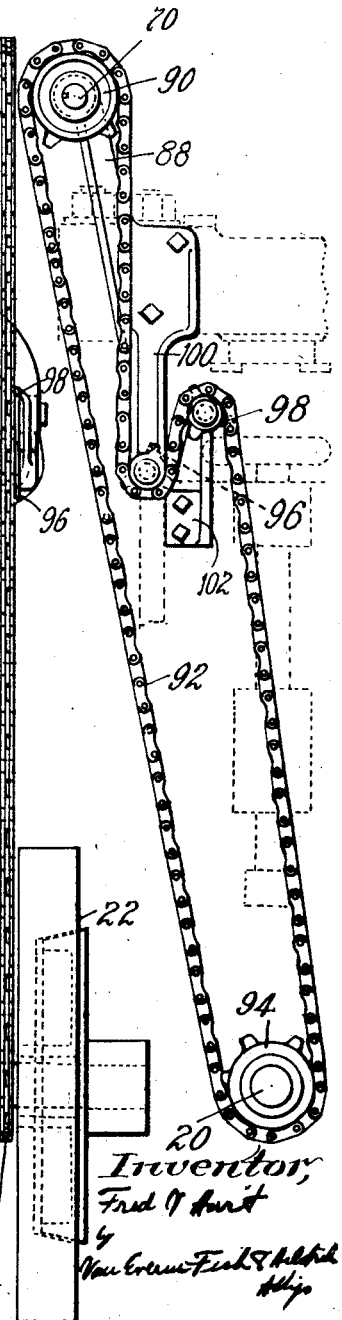

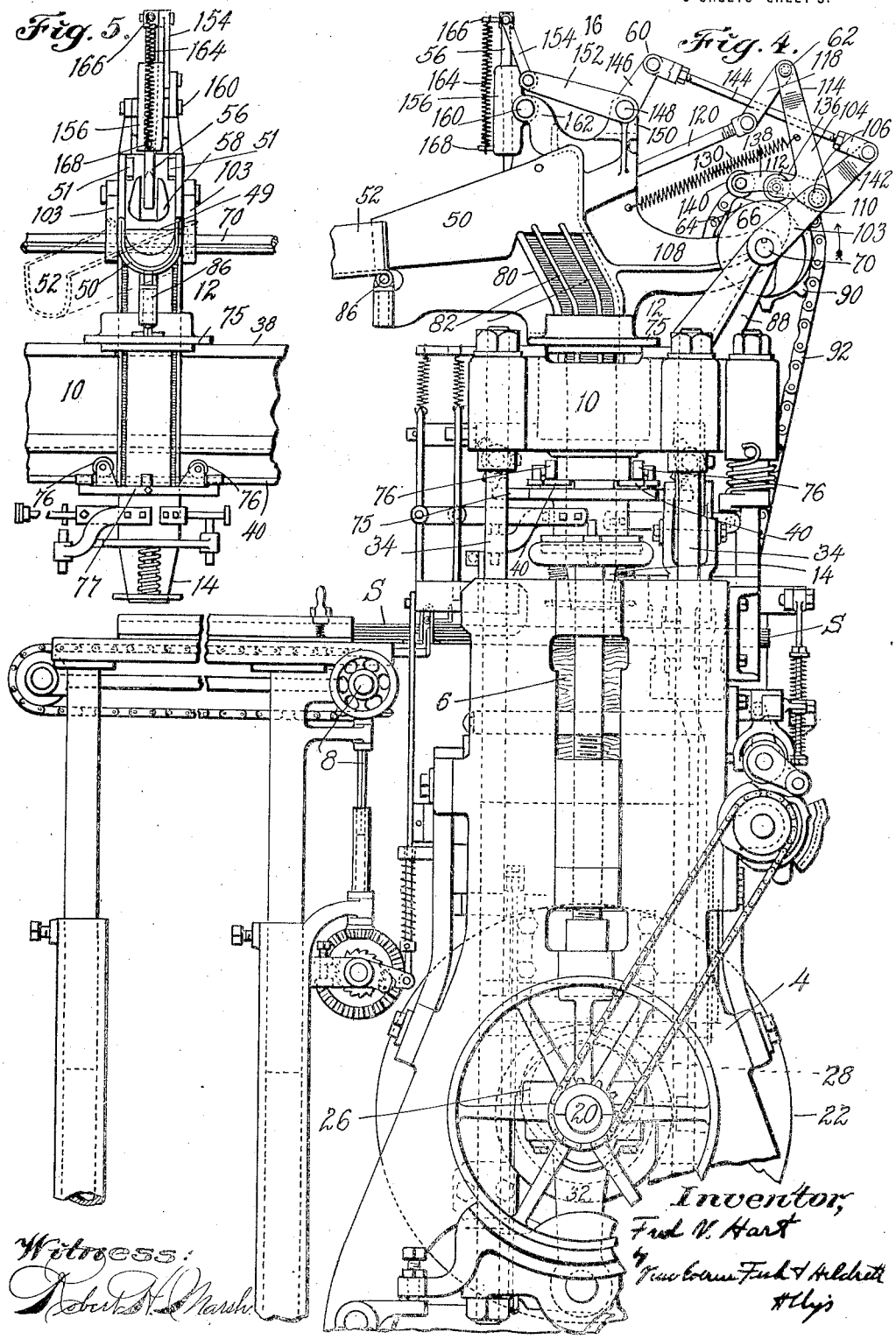

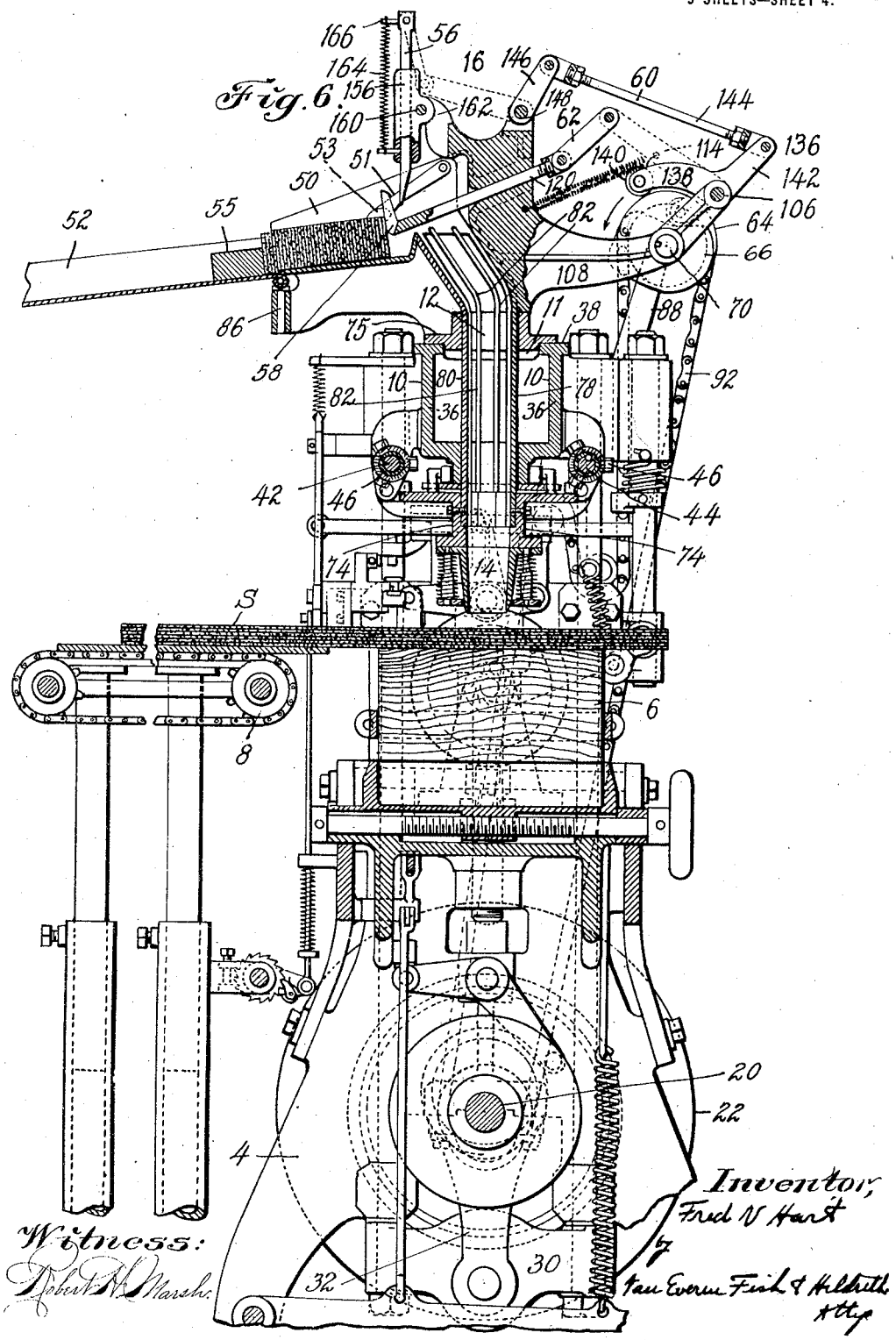

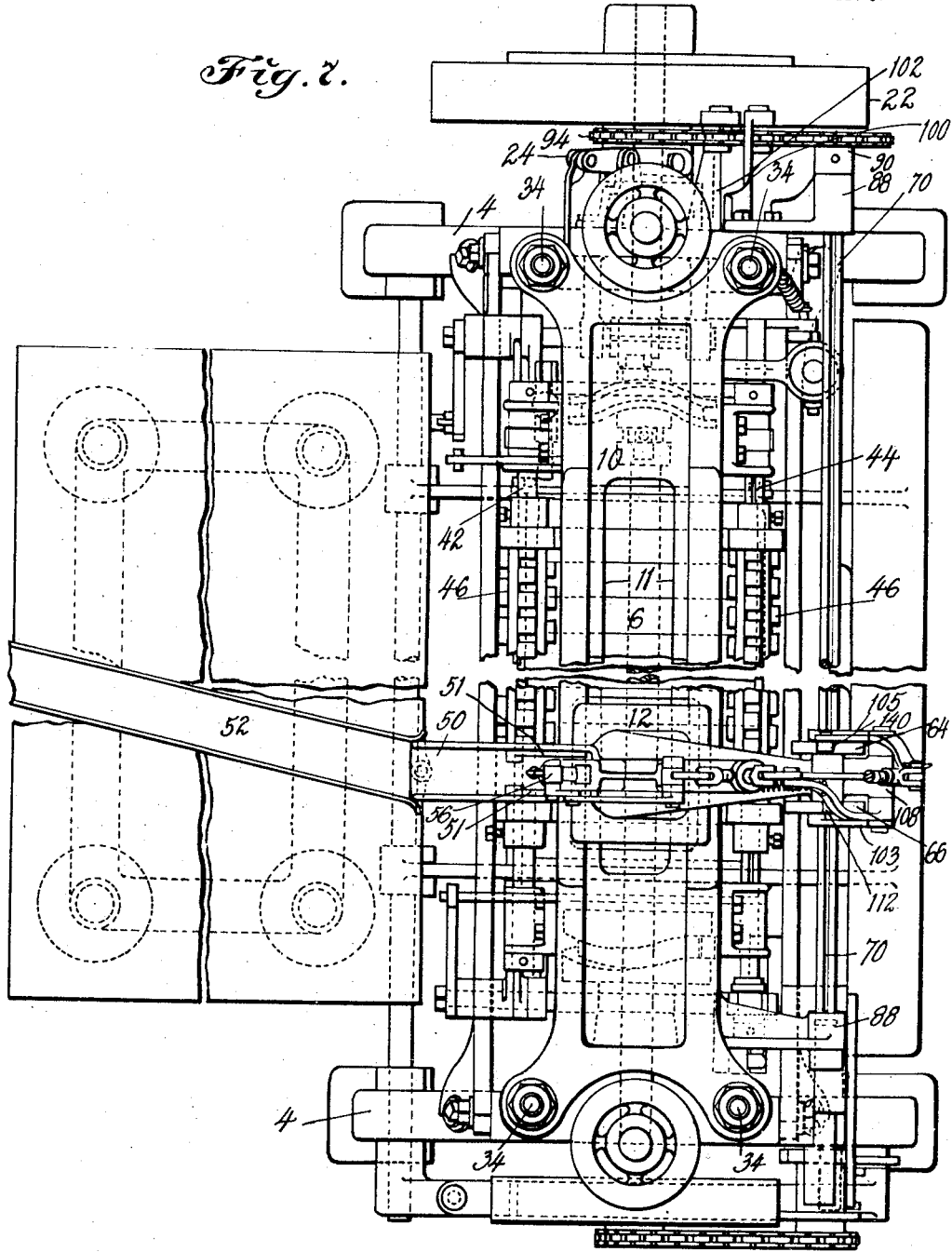

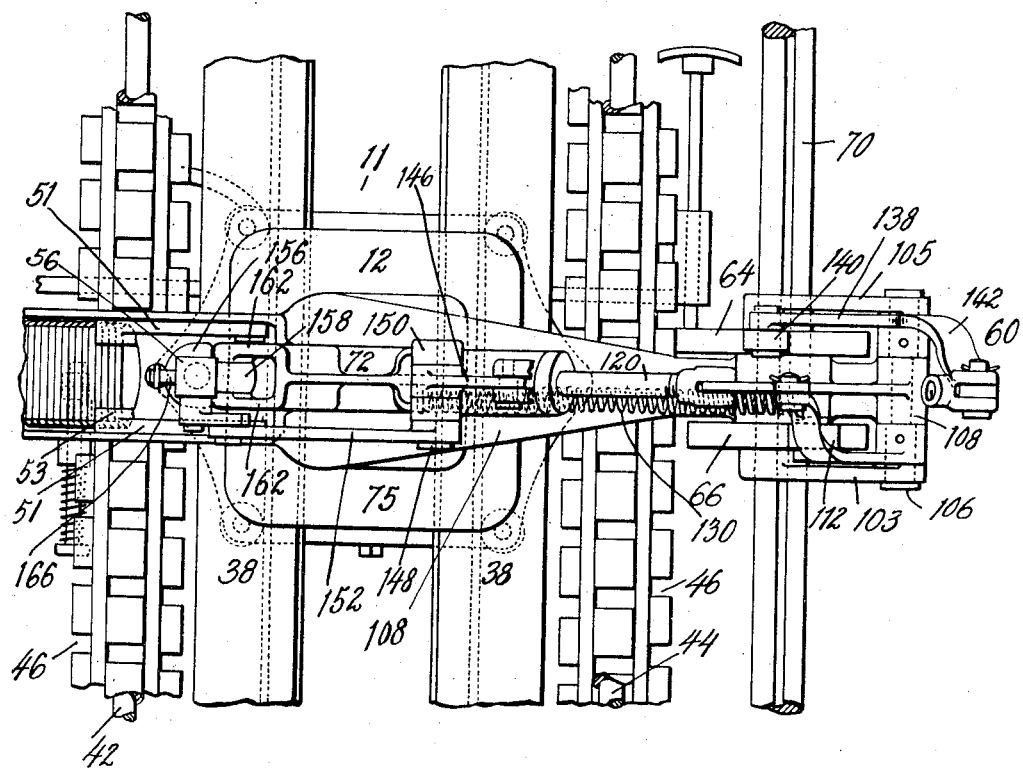

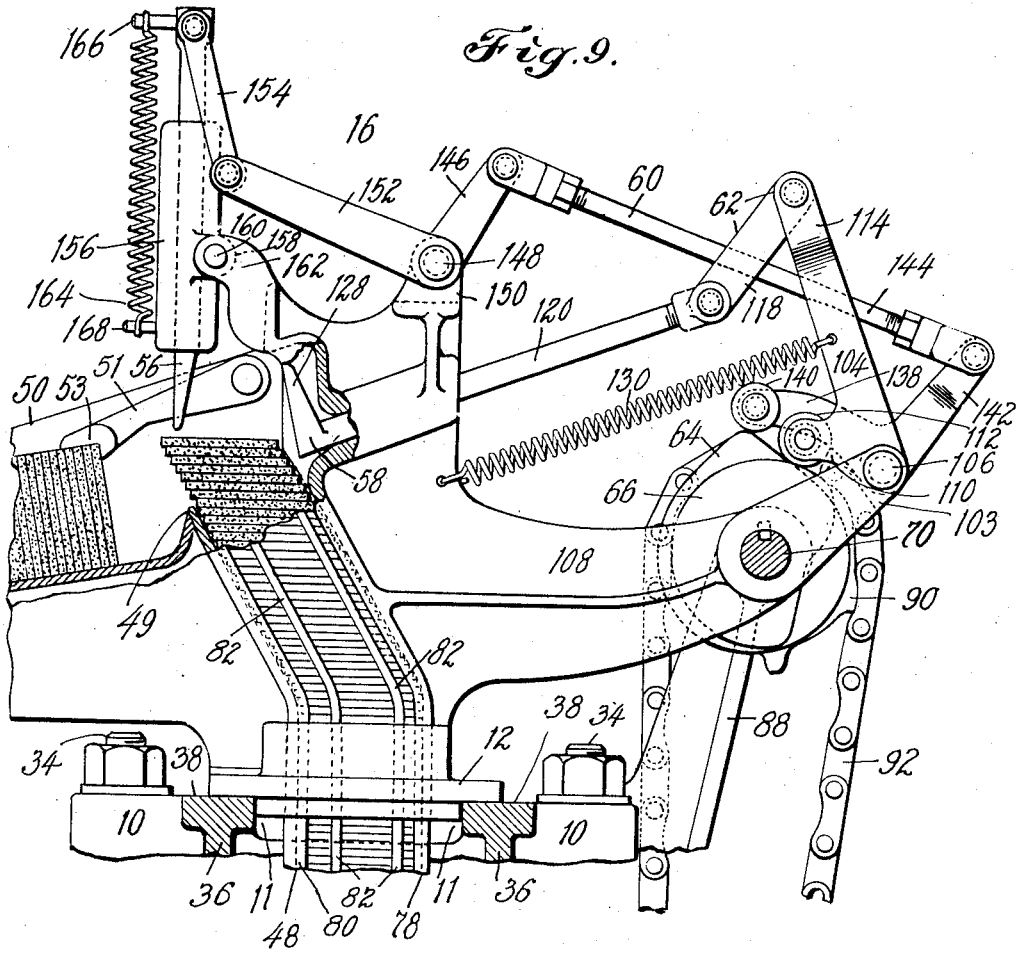
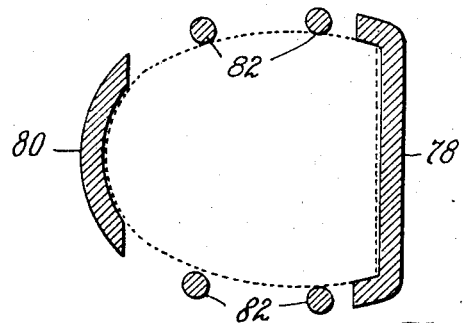

F. V. HART.
STACKING MECHANISM.
APPLICATION FILED SEPT. 14, 1917.

1,344,034.

Patented June 22, 1920.
9 SHEETS—SHEET 8.

Inventor,
Fred V. Hart

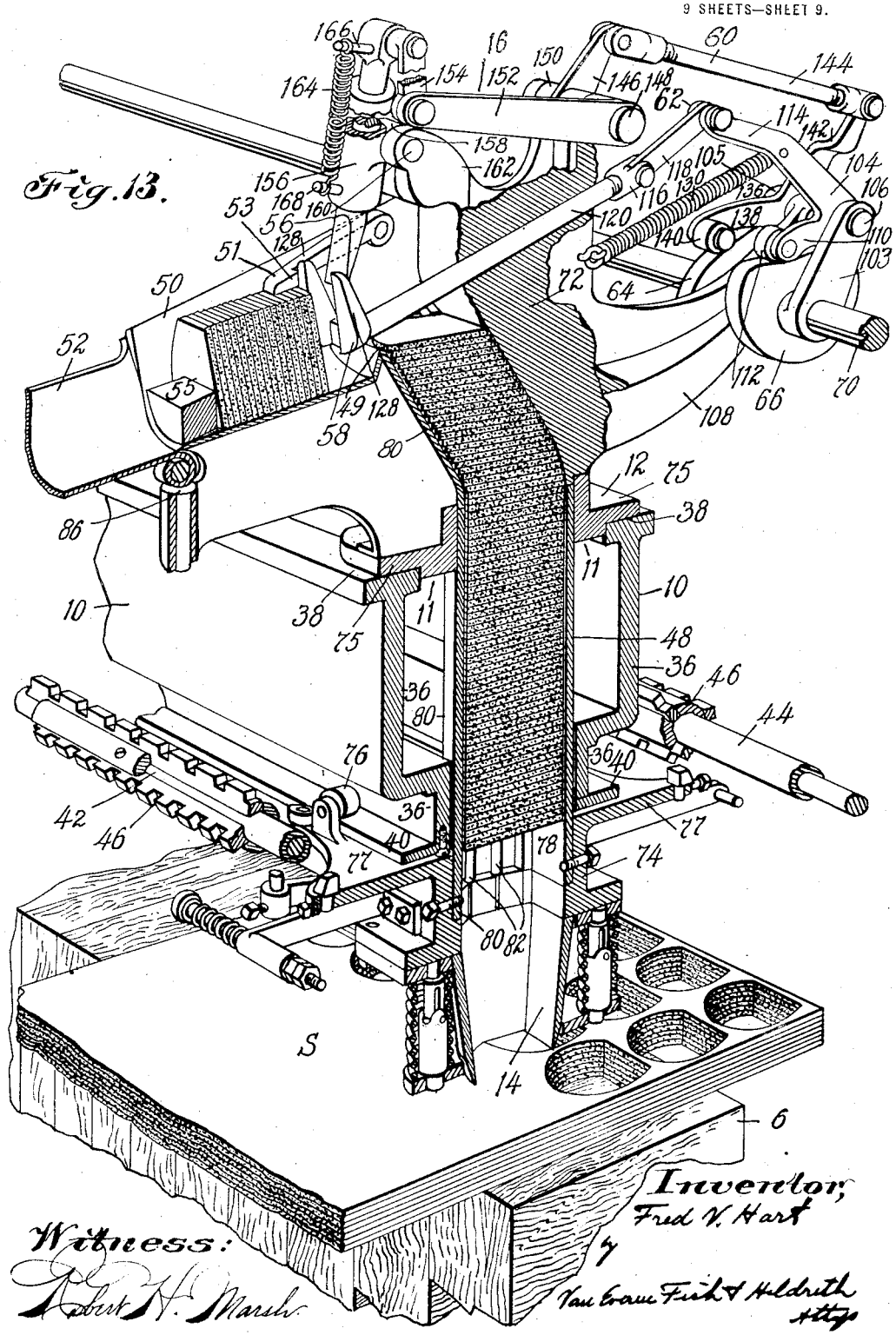

UNITED STATES PATENT OFFICE.

FRED V. HART, OF LYNN, MASSACHUSETTS, ASSIGNOR, BY MESNE ASSIGNMENTS, TO UNITED SHOE MACHINERY CORPORATION, OF PATERSON, NEW JERSEY, A CORPORATION OF NEW JERSEY.

STACKING MECHANISM.

1,344,034. Specification of Letters Patent. Patented June 22, 1920.

Application filed September 14, 1917. Serial No. 191,494.

*To all whom it may concern:*

Be it known that I, FRED V. HART, a citizen of the United States, residing at Lynn, in the county of Essex and State of Massachusetts, have invented certain new and useful Improvements in Stacking Mechanism; and I do hereby declare the following to be a full, clear, and exact description of the invention, such as will enable others skilled in the art to which it appertains to make and use the same.

This invention relates to stacking mechanisms, and it has particular reference to such mechanisms employed in connection with and constituting a part of die-presses or "dinking" machines in which heel-lifts, shoe soles, or the like, are cut from sheet material.

In Letters Patent to Erastus E. Winkley No. 1,082,669, dated December 30, 1913, there is shown and described in detail an automatic die-press of the above indicated character, in which a plurality of heel-lifts are successively cut from several superposed layers of sheet material, the arrangement of parts being such that, as the lifts are cut, they are progressively carried upwardly through the hollow die in stacked relation and ejected therefrom through a suitable side aperture into a receptacle, in which they fall in haphazard, helter-skelter relation.

Among the developments in the commercial manufacture of heels are automatic heel-building machines, in which heel-lifts of selected sizes are stored in stacked relation in suitable magazines or hoppers, from which the requisite number and sizes of lifts are automatically taken and assembled in a predetermined order whereby a heel of any desired dimensions and characteristics may be produced.

When automatic heel-building machines are employed, it becomes necessary to fill the several magazines or hoppers with heel-lifts that are carefully and uniformly stacked with regard to size and arrangement. If the heel-lifts are initially cut in an automatic die-press of the type of said Patent No. 1,082,669, or in fact, if they are produced by any of the die-presses of the prior art, in which the resulting lifts are collected in barrels or other receptacles, a considerable amount of time and expense is required to manually and laboriously stack the lifts in preparation to loading the magazines of the automatic heel-building machine.

One of the objects of the invention, therefore, is to eliminate the expense incident to a manual stacking of the lifts, and to provide simple and expeditious means that may be readily associated with an automatic die-press, whereby the heel-lifts, or other pieces produced, are not only maintained in stacked relation, but are manipulated into a substantially horizontal row to facilitate subsequent handling.

In accomplishing this object in the preferred embodiment of the invention, the hollow die of the Winkley automatic die-press is provided with an extended lift-stacking magazine having its upper portion inclined slightly with respect to the main portion thereof, whereby the successively cut lifts are carried upwardly through the magazine in stacked formation, and are forced into offset or stepped relation. Cooperating means is provided for acting upon the successive groups of lifts as they emerge from the top of the magazine for tilting them progressively in groups into a substantially horizontal receiving member, while maintaining their stacked relation throughout the process.

Various other objects and features of the invention relating to more or less specific structural details and arrangements and locations of parts, will be apparent to those skilled in the art from the drawing and following description. It will, of course, be understood that while, for illustrative purposes, the invention has been set forth in connection with a particular type of die-press, it is not so restricted but is generally applicable, in its illustrated or somewhat modified form, to other classes of machines of materially different characteristics. Therefore, only such limitations should be imposed as are indicated in the appended claims.

In order that the invention may be clearly understood, it has been illustrated as embodied in the automatic die-press described in said patent to Winkley No. 1,082,669, to which reference may be had for a complete description of its construction and operation. The present invention being correlated but slightly to the structural features of the die-press proper, only a brief general description thereof will be given.

Figure 12:
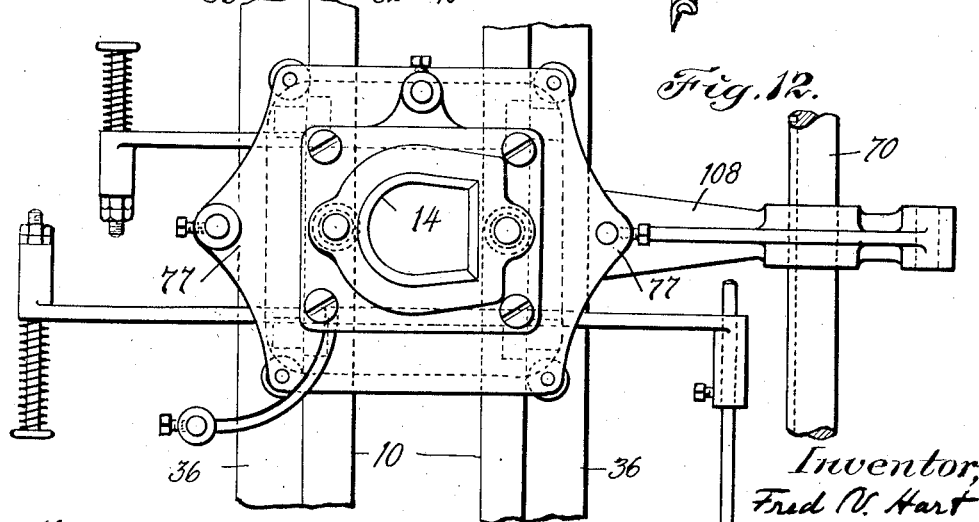

The preferred embodiment of the invention is illustrated in the accompanying drawings, in which Figures 1 and 2, taken together, are a front elevation of the complete machine; Fig. 3 is an end view of a chain driving connection associated with the machine shown in Fig. 1; Fig. 4 is a left-side elevation; Fig. 5 is a rear elevation of the die-carriage and stacking mechanism; Fig. 6 is a view, partially in section and partially in side elevation, looking from left to right in Fig. 1, the section being taken in a plane through the cutting die and stacking mechanism; Fig. 7 is a plan view of the machine shown in Figs. 1 and 2; Fig. 8 is an enlarged plan view of the die-carriage and stacking mechanism; Fig. 9 is an enlarged view, partially in section and partially in side elevation, of a portion of the die-carriage and stacking mechanism, certain parts being broken away for the sake of clearness; Fig. 10 is an enlarged view, in horizontal section, of the stacking magazine; Fig. 11 is an enlarged view, partially in section and partially in side elevation, of the stacking mechanism shown in Fig. 9, and particularly illustrates the relative position of the several parts during a subsequent step in the process of its operation; Fig. 12 is an enlarged, bottom plan view of the die and die-carriage; and Fig. 13 is an enlarged perspective view, partially in section and partially in elevation, of the stacking mechanism, showing particularly the relationship of parts in a step in the process of operation subsequent to that illustrated in Fig. 11.

Referring now to the embodiment of the invention illustrated in the drawings, and more particularly to Figs. 1 and 2, the apparatus shown comprises a stationary frame 2 having side pedestals 4, a cutting block 6, a sheet feeding mechanism 8 (Fig. 6), a reciprocating press-head 10, a die-carriage 12, a die 14, and a lift stacking mechanism 16.

The frame 2 supports the cutting block 6, which is preferably adjustably mounted thereon and comprises a plurality of wooden blocks upon which are supported the layers of sheet material S, from which lifts are cut. The layers of sheet material S are initially disposed upon the feeding mechanism 8 and are intermittently advanced or fed thereby at predetermined times, as will be hereinafter more specifically pointed out.

The side pedestals 4 carry, in suitable bearings, a power shaft 20 which is driven from a source of power (not shown) through the agency of a combined clutch and pulley mechanism 22 of well-known form, which is adapted to be actuated at the will of the operator by means of a suitable shipper mechanism 24, in a convenient manner. The respective ends of the shaft 20 are provided with eccentrics 26 (Fig. 6) which severally coöperate with eccentric straps 28 that are connected to crossheads 30 by means of pitmen 32. Each of the crossheads 30 is fixed to a pair of vertically projecting rods 34, the upper ends of which are attached to and support the respective ends of the press-head 10. Thus, as the shaft 20 rotates, the crossheads 30, rods 34 and press-head 10, are reciprocated vertically by means of the eccentrics 26, as will be understood.

The press-head 10 (Fig. 13) comprises a beam, having a longitudinal center opening 11, and formed of similar and oppositely disposed side angle members 36, upon which the die-carriage 12 is mounted and adapted for longitudinal movement upon ways 38 and 40. Parallel to and on the opposite sides of the press-head 10 are disposed shafts 42 and 44, each of which is provided with a plurality of notched longitudinal members 46. The notched members 46 associated with the shaft 44, are adapted to coöperate with a portion of the die-carriage 12 for the purpose of actuating the carriage and its associated die 14 longitudinally across the press-head 10 in a series of step-by-step movements, while the notched members 46 associated with the shaft 42, are provided to coöperate with a portion of the die-carriage 12 in order that it and its associated die 14 shall be maintained rigidly in position during each cutting stroke of the die.

The apparatus so far described forms no material part of the present invention, except as it performs certain functions that are necessary to the proper operation of that portion of the apparatus to which it invention directly pertains. It is therefore deemed unnecessary to describe this portion of the machine in greater detail, and reference to said Winkley Patent No. 1,082,669 may be had for more specific details of construction and operation. For present purposes, it suffices to understand that the cutting die 14 is reciprocated vertically to and from the layers of sheet material S which are disposed upon the cutting block 6, and that subsequent to each cutting stroke of the die, the latter is advanced longitudinally along the press-head, by suitable means, in a series of steps. In the operation of the machine, therefore, lifts or other pieces, according to the shape of the die, are cut from the sheet material in a transverse row across the sheets, after which the feeding mechanism 8 advances the sheet material upon the cutting block 6 so that another transverse row of cuts may be effected by the die, which is suitably actuated step-by-step across the sheets in the reverse direction.

Referring now more particularly to Fig.

13, the stacking mechanism 16 comprises the die 14, an upwardly extending stacking magazine 48, a substantially horizontal, receiving member 50, a removable extension thereof 52, the die-carriage 12, a pressure member 56, a pusher member 58, linkage mechanisms 60 and 62 for respectively actuating the pressure member 56 and the pusher member 58, a plurality of cams 64 and 66 for respectively actuating the linkage mechanisms just referred to, and an auxiliary power shaft 70 upon which the cams are located.

The die-carriage 12 comprises an upper portion 72, a lower portion 74, and the stacking magazine 48 which rigidly joins them together into a unitary structure. The upper portion 72 of the die-carriage 12 is provided with oppositely projecting, longitudinally extending feet or slides 75 which rest upon the ways 38 of the press-head 10, while the oppositely projecting angle members 77 of the lower portion 74 are provided with a plurality of rollers 76, which assist in supporting the carriage and rest upon the outwardly extending ways 40 that constitute a part of the lower portion of the members 36 of the press-head 10.

The die 14, which may be of any suitable form and construction, is fixed to the lower portion 74 of the carriage 12 and in registry with the stacking magazine 48. This magazine 48 rigidly joins the upper and lower portions 72 and 74 of the die-carriage and extends upwardly through the opening 11 between the members 36 of the press-head 10, and comprises (Fig. 10) a breast member 78 of channel form, a curved heel member 80, and a plurality of rods 82 that are disposed on the opposite sides of the magazine in pairs and in spaced relation, whereby the opposite sides of the magazine are provided with sufficiently large longitudinal openings for the ready insertion of the fingers of the operator to facilitate the removal and adjustment of the lifts contained therein, if desired. The magazine 48 is so constructed that its upper portion is inclined slightly with respect to its lower portion, so that as the lifts are cut from the sheet material and are progressively stacked and forced upwardly through the die 14 and magazine 48, they are successively forced into offset or stepped relation when they reach the upper inclined portion of the magazine.

The horizontal receiving member 50 (Figs. 9, 11 and 13) is disposed adjacent to one side of the upper end of the magazine 48, and is of such shape as to conform in general to the configuration of the lifts and to receive and hold them in proper stacked relation. Latches 51 are pivotally mounted upon and within the respective sides of the receiving member 50, and their free ends are provided with angle members 53 to engage and maintain the stacked lifts in position. The extension member 52 (Figs. 7 and 13) is of similar shape to that of the main receiving member 50, and its inner end is supported by a suitable universal pin connection 86 of well-known form. Thus, the removable extension member 52 is permitted to readily adapt itself to the vertical reciprocatory movements of the press-head 10 as well as to the step-by-step longitudinal movements of the die-carriage 12. The outer end of the removable extension member 52 is supported in any convenient manner. A weighted member 55 is slidably disposed within the receiving member 50, against which the lifts are stacked.

The auxiliary shaft 70 is carried in bearings in bracket members 88 which are fastened to the respective ends of the press-head 10 (Figs. 1 and 2), and receives its rotative movement through the agency of a sprocket 90 that is keyed to one end thereof, a chain 92 coöperating therewith, and a sprocket 94 that is fixed to the main power shaft 20. In order to maintain an effective driving connection between the shafts 70 and 20 throughout the reciprocatory movement of the press-head 10, it is necessary to provide suitable means for taking up the slack of the chain 92, incident to the downward movement or cutting stroke of the press-head. This result is accomplished by means of a plurality of idler sprockets 96 and 98 (Fig. 3) which are respectively associated with and carried by the reciprocating press-head 10 and the stationary side pedestal 4, upon the respective brackets 100 and 102. With this arrangement, it is evident that the driving chain 92 is always maintained at a definite tension, whereby the effectiveness of the driving connection remains intact throughout the operation.

The upper portion 72 of the carriage 12 is provided with an upwardly curved and forwardly extending arm 108 (Figs. 8 and 13) which carries at its outer end a stud 106 that projects outwardly therefrom on both sides. Bell-cranks 104 and 136 are pivotally mounted upon the respective ends of the stud 106, and fixed to the respective extremities of said stud are supporting and guiding arms 103 and 105. The other ends of the arms 103 and 105 loosely surround the shaft 70 and are adapted to move longitudinally thereon in accordance with the movements of the carriage 12 along the press-head 10.

The cams 64 and 66 are loosely splined to the shaft 70 and are disposed on the respective sides of the arm 108 and between the supporting and guiding arms 103 and 105. The cams 64 and 66 are adapted, therefore, to be moved longitudinally with respect to the shaft 70, while being rotated thereby. The linkage mechanism 62 comprises the bell-crank 104, the short arm 110 of which is provided with a roller 112 that coöperatively engages the periphery of the cam 66, and therefore serves to actuate the bell-crank 104 in accordance with the peculiar contour of the cam face. The longer arm 114 of the bell-crank 104 is pivotally connected to one end 116 of the pusher member 58 by means of a short lost-motion link 118, for permitting the actuation of the pusher member 58 without binding.

The pusher member 58 comprises a rod 120 that extends through a recess in the upper portion 72 of the die-carriage 12 at an angle slightly inclined to a horizontal plane, and the outer end of said pusher member 58 is bifurcated and provided with a plurality of fingers 128 having substantially flat inclined faces which are spaced apart to engage the surfaces of the tilted lifts, as hereinafter set forth. A tension spring 130 is connected to the arm 114 of the bell-crank 104 and to the upper portion 72 of the carriage 12, which serves to maintain the roller 112 in coöperative relation with the peripheral face of the cam 66.

The linkage mechanism 60 comprises the bell-crank 136, which is also pivotally mounted upon the stud 106, and carries a roller 140 on its short arm 138 that coöperatively engages the peripheral face of the cam 64, while the outer end of its long arm 142 is pivotally associated with one end of a rod 144. The other end of the rod 144 has a pivotal connection to a short arm 146 that is fixedly pinned to a stud 148 which is rotatably mounted in lugs 150 projecting upwardly from the upper portion 72 of the die-carriage 12. An arm 152 is also fixed to the stud 148, and its outer end has a pivotal connection to the lower end of a substantially vertical, connecting link 154, the upper end of which is pivotally associated with the upper end of the pressure member 56. This pressure member 56 extends through a guide member 156 (see Fig. 11) that is provided with a laterally extending lug 158 which is mounted for rotative movement upon a stud 160 that is carried between upwardly extending lugs 162, constituting integral parts of the upper portion 72 of the die-carriage 12. The lower end of the pressure member 56 is beveled into a substantial chisel point and is so located, with respect to the offset lifts in the upper end of the magazine 48, that, during its vertical reciprocatory movement, it will engage and act upon them during certain intervals of the operation, as will be more specifically set forth. In order to maintain the roller 140 in engagement with the cam 64 and to serve in conjunction with said cam to actuate the pressure member 56, a tension spring 164 is provided, the respective ends of the latter being attached to pins 166 and 168 that are respectively associated with the upper end of the pressure member 56 and the lower portion of the guide member 156. The pressure member 56 is so mounted that, in its normal position (Fig. 9), it lies in a vertical plane slightly removed from, but adjacent to, the upper end of the heel member 80, which forms a wall of the stacking magazine 48.

Having described the structural details of the stacking mechanism, particular reference may now be had to Fig. 9, in which the various parts of the mechanism are illustrated as occupying their normal initial position. For purposes of explanation, it will be assumed that the stacking magazine 48 has been filled with heel lifts which have previously been cut out from the sheet material, and that the last cutting stroke of the die has forced a plurality of layers of stepped lifts above the upper end of the magazine 48, as shown in Fig. 9.

As the auxiliary power shaft 70 rotates the cams 64 and 66 in a counter-clockwise direction, the peculiar configuration of the cam 64 in engagement with the roller 140 permits the spring 164 to force the pressure member 56 downwardly. The lower end of the pressure member 56 is thereby brought into engagement with the overhanging or stepped portion of the uppermost heel lift in the stack, and, upon further downward movement of the pressure member, the group of stepped heel lifts that are disposed above the upper end of the magazine 48, are tilted, as shown in full lines in Fig. 11, upon the edge or ridge 49 that is formed at the juncture of the receiving member 50 and the heel member 80. During the continuance of the tilting operation, the above-mentioned group of lifts are caused to slide forward and to become tilted through a relatively large angle until they occupy a position somewhat as shown by the substantially vertical dotted lines in Fig. 11. By reason of this tilting of this group of lifts, the lower end of the pressure member 56 is carried outwardly, as illustrated in dotted lines in Fig. 11, which movement is permitted by the pivotal support of the guide member 156 upon the stud 160.

The cams 64 and 66 are so designed and angularly positioned with respect to one another that when the operation of the pressure member 56 has proceeded to a stage slightly subsequent to that illustrated in dotted lines in Fig. 11, the pusher member 58 is advanced toward the lifts by means of the spring 130. As the operation progresses, the fingers 128 of the pusher member 56 are brought into engagement with the right-hand or rear end of the tilted group of lifts. The further advancement of the pusher member 58 causes the tilted lifts to be pushed against the lifts already in the receiving trough member 50. During the first part of this operation the lower end of the pressure member 56 lies against the left-hand or forward end of the group of tilted lifts, but during the latter portion thereof the lower end of the pressure member 56 is carried farther outwardly, and before the pusher member 58 has reached its extreme forward position, the cam 64 and its associated connections have withdrawn the pressure member from between the heel lifts. Subsequently, the pusher member 58 acts on the heel lifts disposed in the receiving member 50 and advances them, with the weighted member 55, to the left to the position shown in Fig. 6, as will be understood. Having thus completely tilted the upper group of lifts and deposited them in the receiving member 50, the pusher member 58 and the pressure member 56 are withdrawn to their initial positions, as illustrated in Fig. 9. Just prior to such withdrawal, the angle members 53 of the latches 51 engage the lifts and retain them in position while the cycle of operation is repeated. Fig. 13 illustrates an intermediate step in the withdrawal operation.

The mechanism is now in position for another downward cutting stroke of the press-head 10 and associated die 14, whereupon another group of lifts are cut from the layers of sheet material and the uppermost group of lifts in the magazine 48 are caused to emerge from the top of said magazine. The cycle of operation then continues in the manner already described, whereby the lifts which are progressively stacked and forced upwardly in the magazine 48, are successively offset or stepped and tilted in groups through a relatively large angle into the receiving member 50. It will be noted that during this manipulation of the stacked heel lifts, the plane of stacking, which is substantially horizontal within the magazine 48, is changed to a substantially vertical plane in the receiving member 50. Moreover, the manipulation of the lifts is such that throughout the operation the stacked relation of the lifts is maintained and the lifts are progressively transferred from a vertical column within the magazine 48 to a horizontal stack upon the receiving member 50 and its removable extension 52, whereby the lifts may be removed, in their stacked formation, with facility.

The nature and scope of the present invention having thus been indicated and the preferred embodiment of the invention having been specifically described, what is claimed as new is:—

1. A stacking machine having, in combination, a die for cutting and holding in stack formation pieces of sheet material, and movable means acting upon said stacked pieces for materially modifying the plane of stacking while maintaining the pieces in stacked relation.

2. A stacking machine having, in combination, a die for cutting and holding pieces of sheet material that are stacked in a predetermined plane, a receiving member disposed in substantially the stacking plane of said pieces, and movable means acting upon the pieces for moving said pieces into the receiving member and into a different stacking plane while maintaining the pieces in stacked relation.

3. A stacking machine having, in combination, a die for cutting pieces from sheet material and stacking said pieces in a predetermined plane, and intermittently actuated means for acting upon successive groups of the stacked pieces to tilt said pieces into a different stacking plane while maintaining their stacked relation.

4. A stacking machine having, in combination, a die for cutting pieces from sheet material, a magazine associated therewith in which the pieces are progressively stacked in side by side relation, a receiving member disposed at an angle thereto, and intermittently actuated means for acting upon successive groups of said stacked pieces to tilt them into said receiving member and stack them therein.

5. A stacking machine having, in combination, a die for cutting pieces from sheet material, a magazine associated therewith in which the pieces are progressively stacked in side by side relation, said magazine having one portion thereof disposed at an angle to another portion thereof whereby the stacked pieces are successively forced into stepped relation, means acting upon the end piece of the stepped section thereof for tilting said piece into a different plane, and means for advancing the tilted pieces in stacked relation in a predetermined direction.

6. A lift stacking machine having, in combination, a die for cutting lifts from sheet material and provided with a curved passage extending therethrough in which the lifts are progressively stacked one above another and forced into stepped relation, a receiving member disposed at substantially right angles to the passage in said die, a pressure member for engaging the stepped portion of the upper lift for tilting a plurality of lifts through an angle into said receiving member, and a pusher member acting upon the tilted lifts for advancing them along the receiving member and maintaining them in stacked relation.

7. A stacking machine having, in combination, a die for cutting blanks provided with a magazine in which the blanks are progressively stacked from its lower end, said magazine having its upper portion inclined with respect to its lower portion whereby the blanks are forced into stepped relation, a pressure member for engaging the upper blank and tilting a plurality of blanks disposed above the magazine, a pusher member acting at substantially right angles to said pressure member for actuating the tilted blanks, and means for actuating said pressure member and said pusher member in a predetermined sequence.

8. A die-press having, in combination, a cutting block, a reciprocating press-head having a longitudinal opening therein, a die-carriage slidably mounted upon said press-head and adapted to be moved longitudinally thereupon, a stacking magazine associated with said die-carriage and extending upwardly through said opening, and a hollow die associated with the lower end of said magazine and movable both with said die-carriage and said reciprocating press-head.

9. A die-press having, in combination, a stationary frame, a reciprocating press-head, a cutter carried thereby, an auxiliary power shaft associated with said press-head and movable therewith, mechanism carried by said press-head and actuated by said auxiliary power shaft, a main power shaft associated with said stationary frame, a flexible driving connection between said power shafts, and idlers coöperating with said driving connection and associated with said press-head and said stationary frame for maintaining said driving connection effective throughout the reciprocatory movements of said press-head.

10. The process of stacking blanks which comprise, progressively cutting a plurality of blanks, progressively superposing said blanks one above another in a column, successively stepping or offsetting the blanks at one end of the column and thereafter progressively tilting said blanks into a different stacking plane.

11. The process of stacking blanks which comprises progressively cutting a plurality of blanks, progressively superposing said blanks one above another in a column, successively stepping or offsetting the blanks at one end of the column, and thereafter progressively tilting said blanks in groups into a different stacking plane while maintaining their stacked relation.

12. The process of stacking blanks which comprises progressively cutting a plurality of blanks, progressively piling a plurality of blanks in a column by adding blanks at the bottom of the column, successively stepping or offsetting the blanks at the upper end of the column, thereafter progressively tilting the upper stepped blanks in groups into a different stacking plane, and progressively advancing the tilted blanks in a predetermined direction.

13. The process of cutting blanks and transferring them from a vertical magazine to a horizontal receiver which comprises cutting a plurality of blanks, progressively feeding the blanks in stacked relation upward through and above the vertical magazine, offsetting or stepping the blanks during their upward feed movement, thereafter progressively tilting the offset blanks above the vertical magazine into the horizontal receiver, and then advancing the tilted blanks in the receiver in stacked relation.

FRED V. HART.